United States Patent [19]
Miyamoto

[11] Patent Number: 5,678,080
[45] Date of Patent: Oct. 14, 1997

[54] COMPACT VIEWFINDER DEVICE USING A FIBER OPTICAL PLATE TO TRANSMIT AN OPTICAL IMAGE

[75] Inventor: Hidenori Miyamoto, Urayasu, Japan

[73] Assignee: Nikon Corporation, Tokyo, Japan

[21] Appl. No.: 549,941

[22] Filed: Oct. 30, 1995

[30] Foreign Application Priority Data

Nov. 1, 1994 [JP] Japan .................... 6-268949
Jul. 24, 1995 [JP] Japan .................... 7-187303

[51] Int. Cl.⁶ .................................... G03B 13/02
[52] U.S. Cl. .................................... 396/267; 396/383
[58] Field of Search .................... 354/219, 224; 355/1; 396/267, 373, 383, 384, 382

[56] References Cited

U.S. PATENT DOCUMENTS

| | | |
|---|---|---|
| 4,541,698 | 9/1985 | Lerner . |
| 4,557,572 | 12/1985 | Schickedanz . |
| 4,963,906 | 10/1990 | Goodman . |
| 5,303,373 | 4/1994 | Harootian, Jr. ............ 385/115 |

FOREIGN PATENT DOCUMENTS

48-30927  4/1973  Japan .
7-20538  1/1995  Japan .

Primary Examiner—David M. Gray

[57] ABSTRACT

A compact viewfinder device suitable for use in a camera. The viewfinder device includes an image-forming optical system to form a subject image on an image-forming plane, and a fiber optical plate having a plane of incidence and an exit plane and which transmits the optical image which has entered the plane of incidence to the exit plane. The plane of incidence of the fiber optical plate is positioned on the image-forming plane of the image-forming optical system, and the fiber optical plate transmits the optical image which has entered the plane of incidence so that it is rotated around an exit axis of the exit plane. The fiber optical plate may also enlarge the optical image entering the plane of incidence so that an enlarged image is transmitted to the exit plane. Further, the exit plane of the fiber optical plate may be tilted with respect to the plane of incidence and perpendicular to the exit axis to allow ease of viewing the viewfinder image.

15 Claims, 7 Drawing Sheets

COMPACT VIEWFINDER DEVICE USING A FIBER OPTICAL PLATE TO TRANSMIT AN OPTICAL IMAGE

BACKGROUND OF THE INVENTION

1. Field of the Invention

The present invention relates to a viewfinder device suitable for use in a camera and, more particularly, the present invention relates to a viewfinder device which uses a fiber optical plate to transmit an optical image.

2. Description of the Related Art

Figure 13:
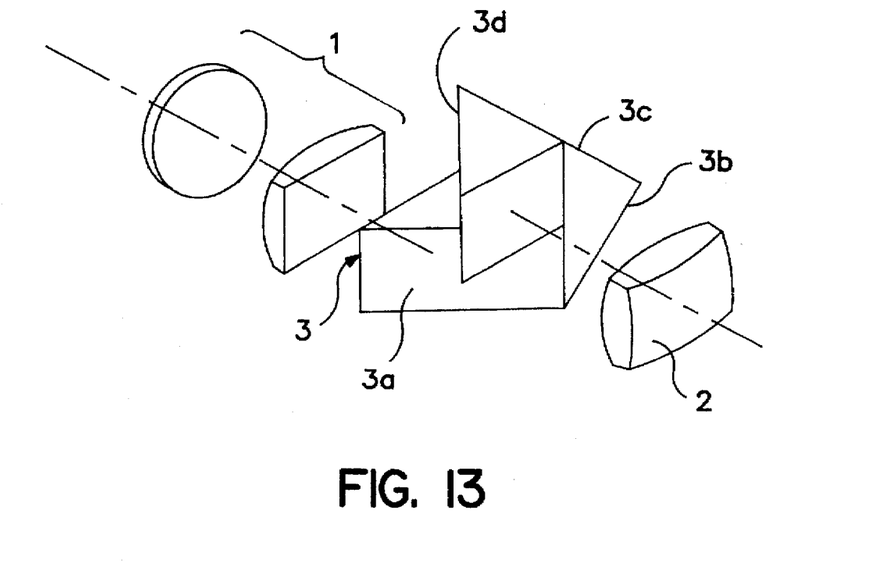
FIG. 13 is a perspective view of a conventional viewfinder device.

Viewfinder devices are conventionally used in cameras for roughly visually checking a photographic range covered by a photographic lens of the camera. FIG. 13 shows an example of a conventional real image viewfinder device. The conventional viewfinder device consists of a reversal prism 3 positioned between an objective lens group 1 and an eyepiece 2. The objective lens group 1 forms an inverted real image which is reversed from top to bottom and left to right by reflecting planes 3a, 3b, 3c and 3d of the reversal prism 3. The image from the reversal prism 3 is guided to the eyepiece 2, where the image is enlarged by the eyepiece 2 and may be observed through the eyepiece 2.

However, the conventional reversal prism 3 takes up a large amount of space since the reversal prism 3 requires four reflecting planes 3a, 3b, 3c and 3d to reverse the inverted real image formed by the objective lens group 1 from top to bottom and left to right. Further, the structure of reflecting planes 3a, 3b, 3c and 3d of the reversal prism 3 is complicated.

Still further, enlargement of the area of the reflecting planes 3a, 3b, 3c and 3d is difficult because the space in the viewfinder for the reversal prism 3 is limited. As a result, problems with visibility occur since expansion of the exit luminous flux from the reversal prism 3 is small, and an image in the viewfinder cannot be seen without peering into the eyepiece 2.

Moreover, in order to use the conventional viewfinder as a waist-level viewfinder in a camera, it is necessary to attach an interchangeable reflecting plane in the optical path of the reversal prism 3 and to install a separate eyepiece, making the structure of the waist-level viewfinder very complicated.

SUMMARY OF THE INVENTION

It is an object of the present invention to provide a compact viewfinder device which uses a fiber optical plate to transmit an image.

It is an object of the present invention to provide a viewfinder device including a fiber optical plate having a plane of incidence on which a subject image is formed and an exit plane to which the subject image is transmitted.

It is an object of the present invention to provide a viewfinder device including a fiber optical plate which rotates an optical image entering a plane of incidence of the fiber optical plate so that the image is rotated on an exit plane of the fiber optical plate.

It is an object of the present invention to provide a viewfinder device including a fiber optical plate which enlarges an optical image entering a plane of incidence so that the optical image becomes an enlarged image on an exit plane.

It is an object of the present invention to provide a viewfinder device including a fiber optical plate having an exit plane which is tilted with respect to an exit axis so that an optical image on the exit plane is formed in a direction perpendicular to the direction of the exit axis and perpendicular to the exit axis itself.

It is another object of the present invention to provide a viewfinder device including a fiber optical plate having an exit plane which is tilted with respect to a plane of incidence and is perpendicular to an exit axis, and the optical image on the exit plane is formed in a direction which is tilted with respect to the plane of incidence.

It is another object of the present invention to provide a viewfinder device including a fiber optical plate having a roof mirror which reverses from top to bottom and left to right an optical image which enters the plane of incidence of the fiber optical plate and transmits the optical image to the exit plane without rotating the optical image around the exit axis.

It is another object of the present invention to provide a viewfinder device including a fiber optical plate and an eyepiece positioned at a specified location on an exit plane side of the fiber optical plate, Additional objects and advantages of the invention will be set forth in part in the description which follows, and, in part, will be obvious from the description, or may be learned by practice of the invention.

Objects and advantages of the present invention are achieved in accordance with embodiments of the present invention with a viewfinder device including an image-forming optical system which forms an image of a subject on an image-forming plane, and a fiber optical plate having a plane of incidence and an exit plane. The fiber optical plate transmits an optical image which enters the plane of incidence to the exit plane. The plane of incidence of the fiber optical plate is positioned on the image-forming plane of the image-forming optical system.

In accordance with embodiments of the present invention, the fiber optical plate transmits the optical image which has entered the plane of incidence so that the optical image is rotated around an exit axis of the exit plane.

In accordance with embodiments of the present invention, the fiber optical plate is a tapered fiber optical plate which enlarges the optical image entering the plane of incidence and transmitted to the exit plane.

In accordance with embodiments of the present invention, the exit plane of the fiber optical plate is tilted with respect to the exit axis.

In accordance with embodiments of the present invention, the exit plane of the fiber optical plate is tilted with respect to the plane of incidence and the fiber optical plate is arranged perpendicular to the exit axis.

In accordance with embodiments of the present invention, the fiber optical plate comprises a roof mirror arranged at a position opposite the exit plane so that the optical image which enters the plane of incidence is transmitted as is without being rotated around the exit axis.

Objects and advantages of the present invention are also achieved in accordance with embodiments of the present invention with a viewfinder device including an image-forming optical system which forms an image of a subject on an image-forming plane; a fiber optical plate having a plane of incidence and an exit plane to transmit an optical image which enters the plane of incidence to the exit plane; and, an eyepiece for viewing the optical image formed by the image-forming optical system. The plane of incidence of the fiber optical plate is positioned on the image-forming plane of the image-forming optical system, and the eyepiece is positioned at a specified location on the exit plane side of the fiber optical plate.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Reference will now be made in detail to the preferred embodiments of the present invention, examples of which are illustrated in the accompanying drawings wherein like reference numerals refer to the same or similar elements throughout.

Figure 1:
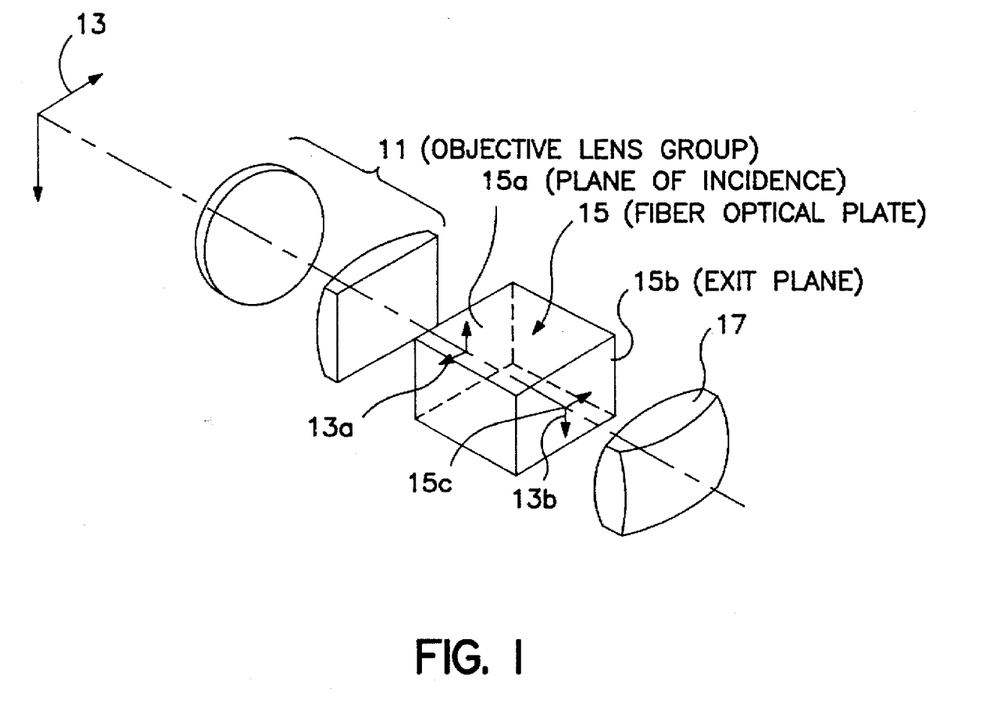
FIG. 1 is a perspective view of a viewfinder device in accordance with a first embodiment of the present invention.

FIG. 1 is a perspective view of a viewfinder device in accordance with a first embodiment of the present invention. The viewfinder device includes an objective lens group 11 which is an image-forming optical system and which forms an image of a subject 13 on an image-forming plane.

The objective lens group 11 has an optical axis represented by a long and short dashed line in FIG. 1. A fiber optical plate 15 is positioned on the optical axis and has a plane of incidence 15a through which an optical image 13a enters the fiber optical plate, and an exit plane 15b which transmits an optical image 13b which has entered the plane of incidence 15a.

The plane of incidence 15a of the fiber optical plate 15 is positioned on the image-forming plane of the objective lens group 11. The fiber optical plate 15 transmits the optical image 13a which enters the plane of incidence 15a and rotates the optical image 13a 180 degrees around an exit axis 15c to transmit a rotated optical image 13b on the exit plane 15b.

An eyepiece 17 is located at the near side of the fiber optical plate 15. The eyepiece 17 enlarges the subject image 13b on the exit plane 15b.

Figure 2A:
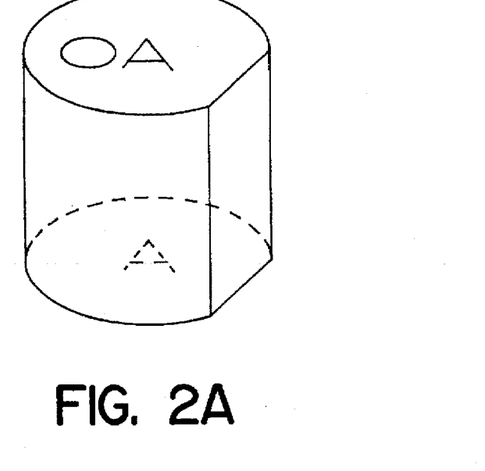
FIGS. 2A–2C show a fiber optical plate structure in accordance with embodiments of the present invention.
Figure 2B:
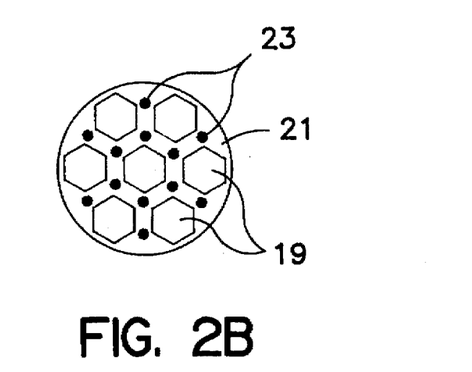
Figure 2C:
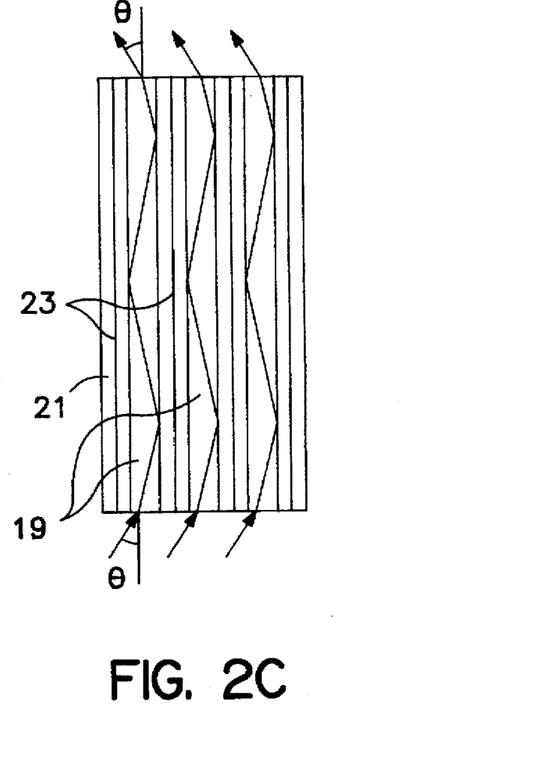

FIGS. 2A–2C show a fiber optical plate which may be used in accordance with embodiments of the present invention. FIG. 2A shows the entire fiber optical plate, and FIGS. 2B and 2C show the details of the dashed-line sections in FIG. 2A.

The basic principles of the fiber optical plate are known and are disclosed in, for example, ITEJ Technical Report, Vol. 16, No. 82, pp. 7–12, IPU' 92–65 (December 1992). The fiber optical plate applies the general principle that, in the boundary plane from optically dense material to optically sparse material, rays which enter at an angle greater than the critical angle of incidence are totally reflected.

In general, as shown in FIGS. 2A–2B, the fiber optical plate comprises three types of glass: core glass 19 having a high index of refraction and which transmits light; cover glass 21 having a low index of refraction and which covers the core glass 19; and, absorber glass 23 which absorbs light which enters the cover glass 21 and light which leaks out from the core glass 19. The structure by which the core glass 19 is covered with cover glass 21 is called a single fiber, and its diameter is extremely thin at 6–25 µm.

The fiber optical plate is manufactured by densely packing the single fiber in two-dimensionally hexagonal directions, then positioning and bonding the absorber glass 23 at each of the vertices of the hexagonally packed single fiber.

Through the above-described structure of the fiber optical plate, the incident light is repeatedly totally reflected at the boundary plane of the core glass 19 and the cover glass 21, and is thereby transmitted to the exit plane 15b from the plane of incidence 15a at the resolution of the diameter of a single fiber. Furthermore, the leaked light is absorbed by the absorber glass 23, thereby reducing cross talk.

Although the fiber optical plate 15 has been described above as comprising glass, the fiber optical plate material is not limited to glass, and any photoconductive material may be used. For example, high molecular compounds such as acrylic resin and polycarbonate resin may be used to construct the fiber optical plate 15.

Because the fiber optical plate 15 functions in two dimensions, the incident optical image can be transmitted to the exit plane 15b at high resolution and with high efficiency. Accordingly, the fiber optical plate 15 functions as an optical element in place of a reversal prism.

In accordance with the first embodiment of the present invention shown in FIG. 1, a reversal fiber optical plate is used as the fiber optical plate 15.

Figure 3:
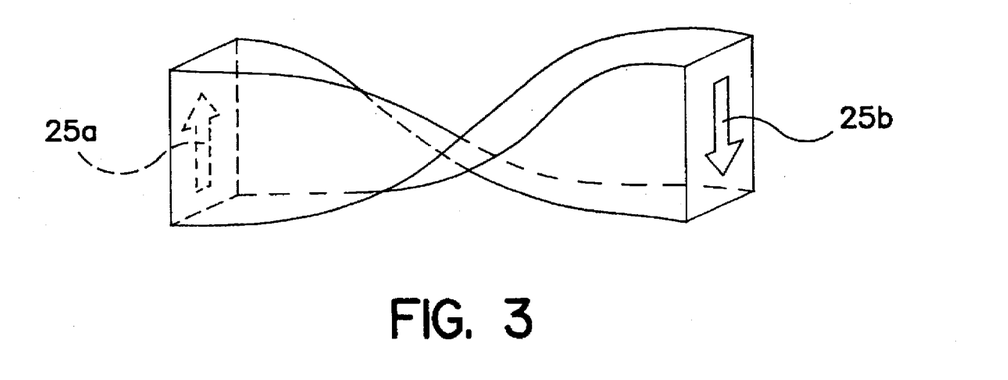
FIG. 3 is a diagram showing a reversal fiber optical plate in accordance with embodiments of the present invention.

FIG. 3 is a diagram showing a reversal fiber optical plate 15 in accordance with embodiments of the present invention. The reversal fiber optical plate shown in FIG. 3 is similar to the fiber optical plate shown in FIG. 2 which has the core glass 19 positioned linearly, except the fiber optical plate is twisted 180 degrees so that an image 25a formed on a plane of incidence becomes a reversed image 25b on the exit plane.

In the viewfinder device described above with reference to FIG. 1, the objective lens group 11 forms an inverted optical 13a image of the subject image 13 on the plane of incidence 15a of the fiber optical plate 15. The inverted image 13a is transmitted via the fiber optical plate 15 and is reversed to become an upright image 13b on the exit plane 15b. The upright image 13b is enlarged by the objective lens 17 and is viewed by the photographer.

The viewfinder device described in accordance with the first embodiment of the present invention eliminates the need for a reversal prism because the inverted optical image 13a of the subject formed on the plane of incidence 15a by the objective lens group 11, is rotated by 180 degrees by the fiber optical plate 15 as the optical image is transmitted to the exit plane 15b of the fiber optical plate 15.

Further, fiber optical plate 15 does not have reflecting planes as does a reversal prism, and, therefore, takes up a smaller amount of space than the reversal prism, enabling a smaller viewfinder device to be achieved.

Moreover, the fiber optical plate 15 does not have reflecting planes as does a reversal prism, and, therefore, the expansion of the exit luminous flux can be made relatively larger, thereby achieving a viewfinder device with which the images are easy to see.

Still further, with the viewfinder device described in accordance with the first embodiment of the present invention, the optical image which enters the plane of incidence 15a of the fiber optical plate 15 is transmitted so that it is rotated around the exit axis 15c of the exit plane 15b. Accordingly, the inverted real image is easily changed to an upright real image without using a reversal prism.

Figure 4:
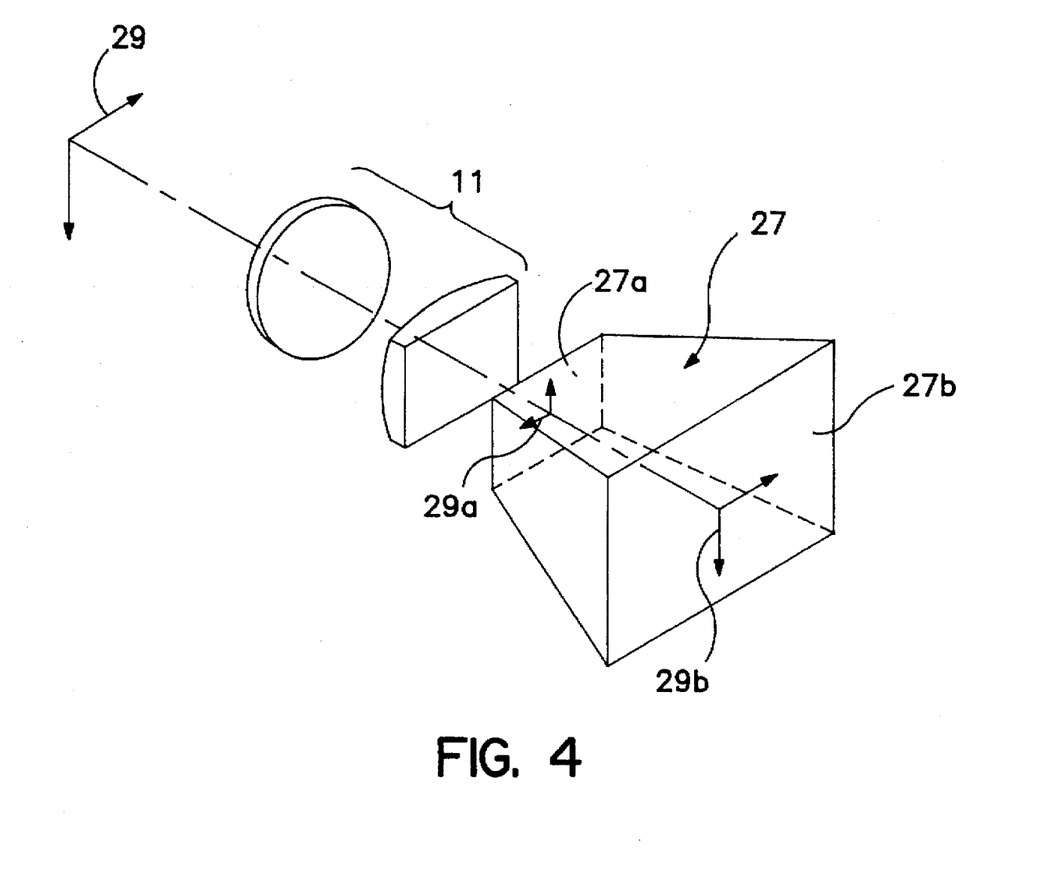
FIG. 4 is a perspective view showing a viewfinder device in accordance with a second embodiment of the present invention.

FIG. 4 is a perspective view showing a viewfinder device in accordance with a second embodiment of the present invention. Like elements in the first and second embodiments are referred to by like reference numerals. In accordance with the viewfinder device of the second embodiment of the present invention, the fiber optical plate comprises a reversal tapered fiber optical plate 27 which transmits an optical image 29a entering a plane of incidence 27a of the reversal tapered fiber optical plate 27 so that the optical image 29a becomes an image which is enlarged on an exit plane 27b of the reversal tapered fiber optical plate 27.

Figure 5:
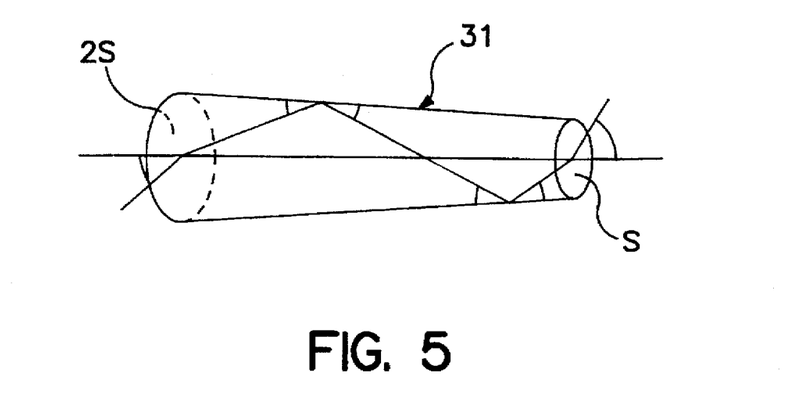
FIG. 5 is a diagram showing an example of single fiber of a tapered fiber optical plate in accordance with embodiments of the present invention.

As shown in FIG. 5, the reversal tapered fiber optical plate 27 is formed by bundling single fibers 31 having different areas on the plane of incidence 27a and exit plane 27b. For example, the fiber 31 shown in FIG. 5 has an area S on the plane of incidence and an area 2S on the exit plane. In accordance with the example shown in FIG. 5, the image 29a on the plane of incidence 27a becomes an image 29b which is enlarged to twice the size of the image 29a on the exit plane 27b.

As shown in FIG. 4, in accordance with the second embodiment of the present invention, the objective lens group 11 forms an inverted image 29a on the plane of incidence 27a of the tapered fiber optical plate 27. The inverted image 29a is then transmitted through the tapered fiber optical plate 27 and is rotated and enlarged to become an upright image 29b on the exit plane 27b enlarged to twice the size of the image 29a. The enlarged image 29b can be observed directly by the photographer without the use of an eyepiece.

With the viewfinder device in accordance with the second embodiment of the invention, the optical image 29a which enters the plane of incidence 27a of the reversal tapered fiber optical plate 27 is transmitted so that it becomes an enlarged image on the exit plane 27b, so the image on the exit plane 27b can be easily directly observed by the photographer.

Therefore, in accordance with the second embodiment of the present invention, the need for an eyepiece is eliminated, and the viewfinder device can be made more compact.

Further, because an eyepiece is not used, the exit pupil diameter becomes infinite, and the eye point also becomes infinite, and, as a result, there is no longer a need to peer inside the viewfinder.

Figure 6:
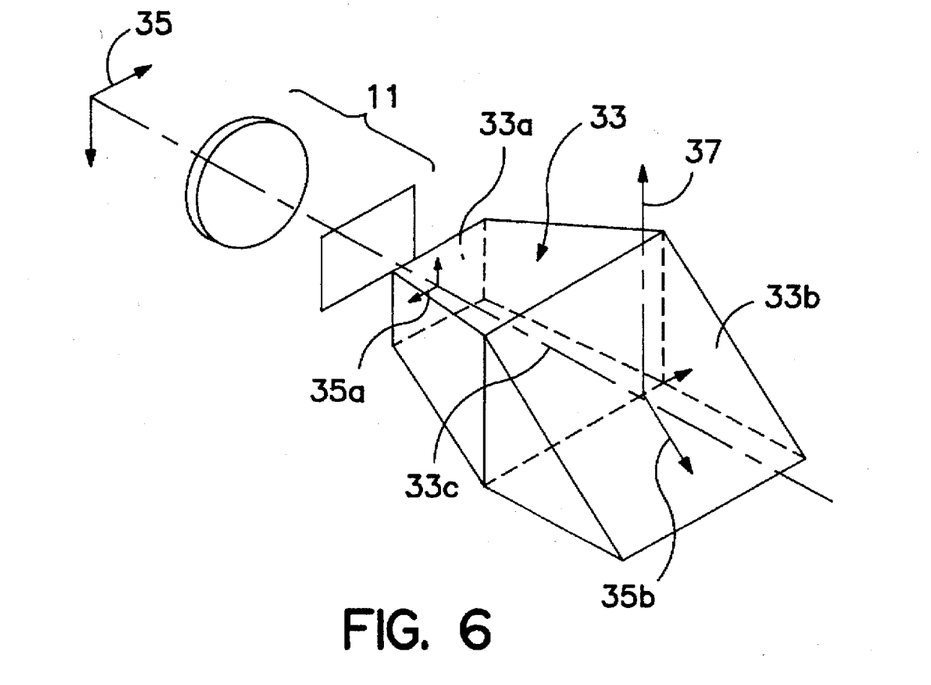
FIG. 6 is a perspective view showing a viewfinder device in accordance with a third embodiment of the present invention.

FIG. 6 shows a perspective view of a viewfinder device in accordance with a third embodiment of the present invention. Like elements in the first, second and third embodiments are referred to by like reference numerals. In accordance with the third embodiment of the invention, a reversal tapered fiber optical plate 33 is used as the fiber optical plate in the viewfinder. The reversal tapered fiber optical plate 33 is formed so that an exit plane 33b of the reversal tapered fiber optical plate 33 is tilted at an angle (for example, 45 degrees) with respect to an exit axis 33c.

In accordance with the viewfinder device of the third embodiment of the present invention, the objective lens group 11 forms an inverted image 35a of a subject image 35 on a plane of incidence 33a of the reversal tapered fiber optical plate 33.

The inverted image 35a is rotated and enlarged as it is transmitted via the fiber optical plate 33, to become an upright image 35b enlarged to twice the size of the image 35a on the exit plane 33b. The upright image 35b is directly observed by the photographer.

Since the exit plane 33b is tilted at an angle, the size of the upright image 35b seen from the direction of an extension of the viewfinder axis 33c and the size of the upright image 35b seen from an axis 37 in a direction perpendicular to the viewfinder axis 33c are equal.

Figure 7:
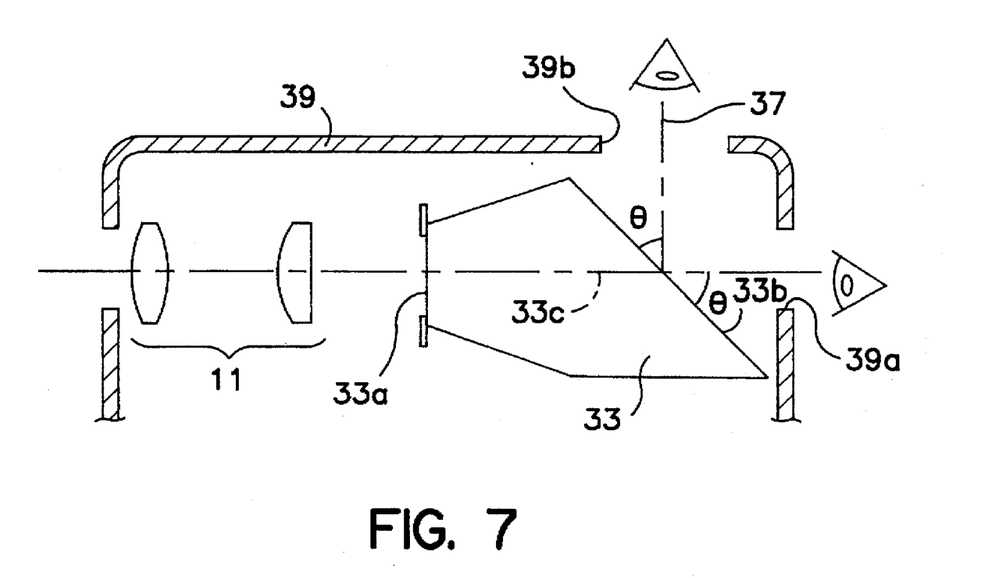
FIG. 7 is a cross-sectional diagram of a camera incorporating the viewfinder device shown in FIG. 6.
Figure 8:
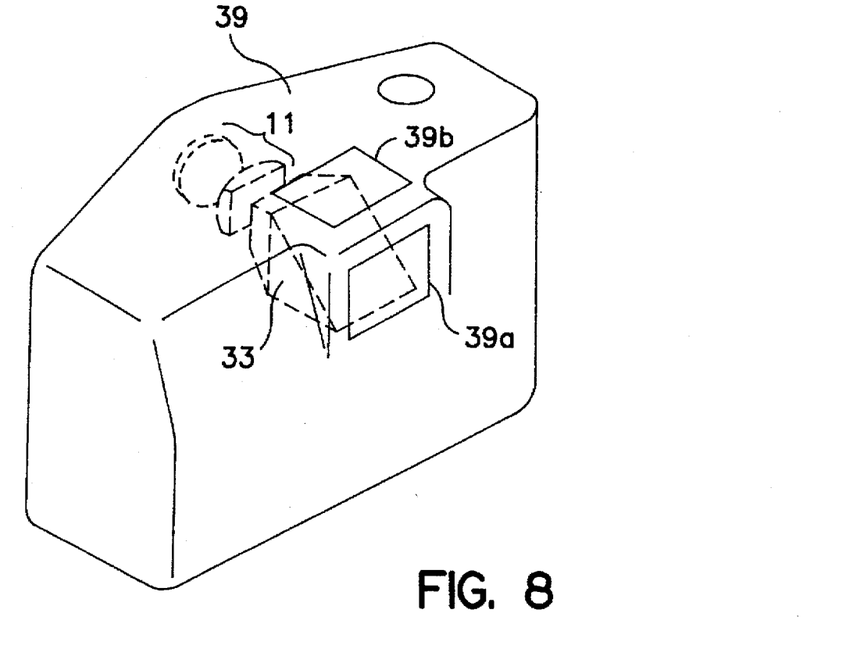
FIG. 8 is a perspective view of a camera incorporating the viewfinder device shown in FIG. 6.

FIG. 7 is a cross-sectional view of a camera including the viewfinder device shown in FIG. 6. FIG. 8 is a perspective view of a camera including the viewfinder device shown in FIG. 6. As shown in FIGS. 7 and 8, an eye-level viewfinder window 39a is formed along the extension of the viewfinder axis 33c in the body 39 of the camera, and a waist-level viewfinder window 39b is formed in the body 39 of the camera in a direction perpendicular to the viewfinder axis 33c.

In accordance with the viewfinder device of the third embodiment of the present invention, the exit plane 33b of the reversal tapered fiber optical plate 33 is tilted with respect to the exit axis 33c, making it possible to easily view the image from both the front and the top of the exit plane 33b.

Therefore, as shown in FIGS. 7 and 8, in accordance with the third embodiment of the present invention, the eye-level viewfinder and the waist-level viewfinder devices can be configured very simply.

Figure 9:
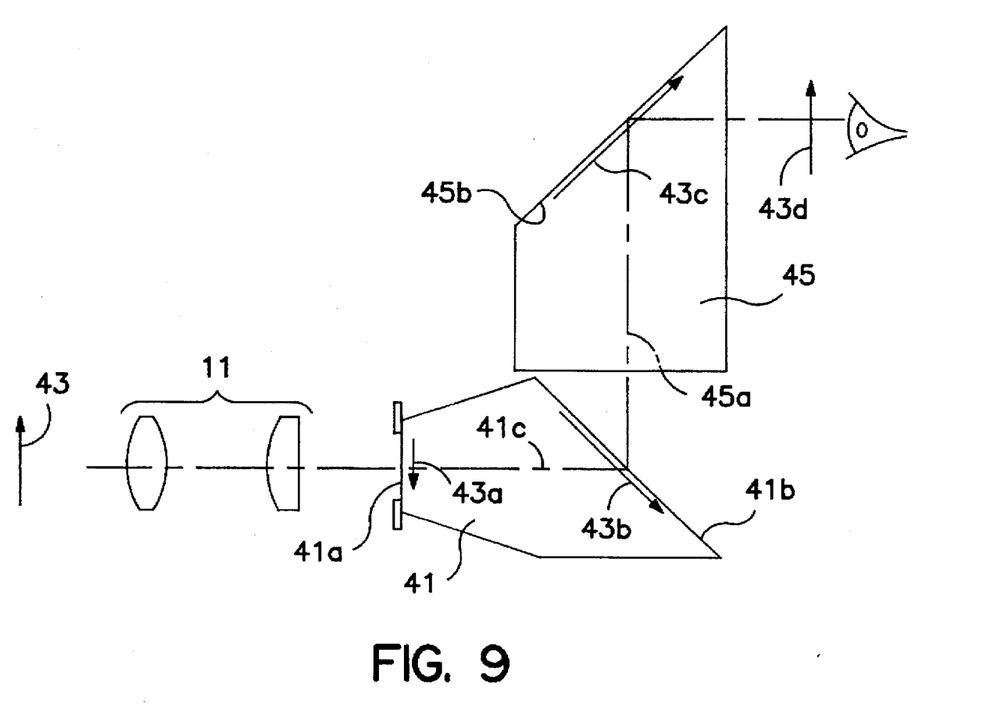
FIG. 9 is a side view of a viewfinder device in accordance with a fourth embodiment of the present invention.
Figure 10:
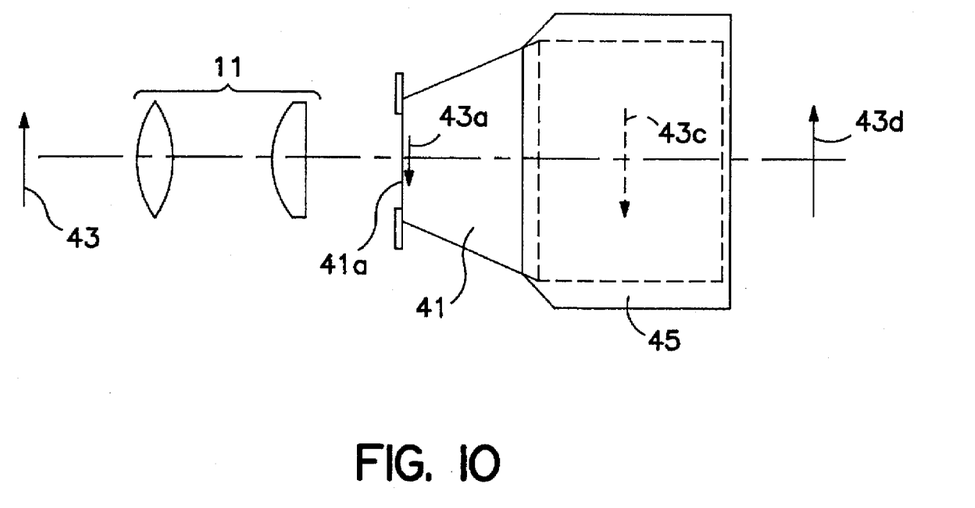
FIG. 10 is a top view of the viewfinder device shown in FIG. 9.

FIG. 9 is a side view of a viewfinder device in accordance with a fourth embodiment of the present invention. FIG. 10 is a top view of the viewfinder device shown in FIG. 9 in accordance with the fourth embodiment of the present invention. Like elements in the first, second, third and fourth embodiments are referred to by like reference numerals.

In accordance with the fourth embodiment of the present invention, a fiber optical plate 41 is formed so that an inverted image 43a which has entered a plane of incidence 41a of the fiber optical plate is transmitted to an exit plane 41b of the fiber optical plate 41 without rotating the image around the exit axis 41c.

The exit plane 41b is tilted at an angle of, for example, 45 degrees with respect to the exit axis 41c. A roof mirror 45 is located at a position opposite from the exit plane 41b. An optical axis 45a of the roof mirror 45 is located perpendicular to the exit axis 41c, and a reflecting plane 45b of the roof mirror 45 is tilted at an angle of, for example, 45 degrees with respect to the optical axis 45a.

In accordance with the viewfinder device of the fourth embodiment of the present invention, the objective lens group 11 forms an inverted image 43a of the subject image 43 on the plane of incidence 41a of the fiber optical plate 41. The inverted image 43a is transmitted as is via the fiber optical plate 41, and it becomes an inverted image 43b which is tilted on the exit plane 41b. The inverted image 43b then becomes an upright image 43c which is reversed from top to bottom and left to right on the reflecting plane 45b of the roof mirror 45, and the reflected upright image 43d is viewed by the photographer.

In accordance with the viewfinder device of the fourth embodiment of the present invention, the inverted image 43b of the exit plane 41b of the fiber optical plate 41 is reversed from top to bottom and left to right by the roof mirror 45. Therefore, the inverted image 43a which has entered the plane of incidence 41a can be transmitted to the exit plane 41b as is, without rotation around the exit axis 41c, and a simple, low-cost fiber optical plate 41 can be achieved.

The fourth embodiment of the present invention has been described with respect to an example in which the exit plane 41b of the fiber optical plate 41 is formed so that it is facing upward and in which a roof mirror 45 is positioned above the exit plane 41b. However, the present invention is not limited to this arrangement of roof mirror 45 and fiber optical plate 41. For example, the exit plane 41b may be formed so that it faces in the horizontal direction, and the roof mirror 45 may be installed at the side of the exit plane 41b.

Figure 11:
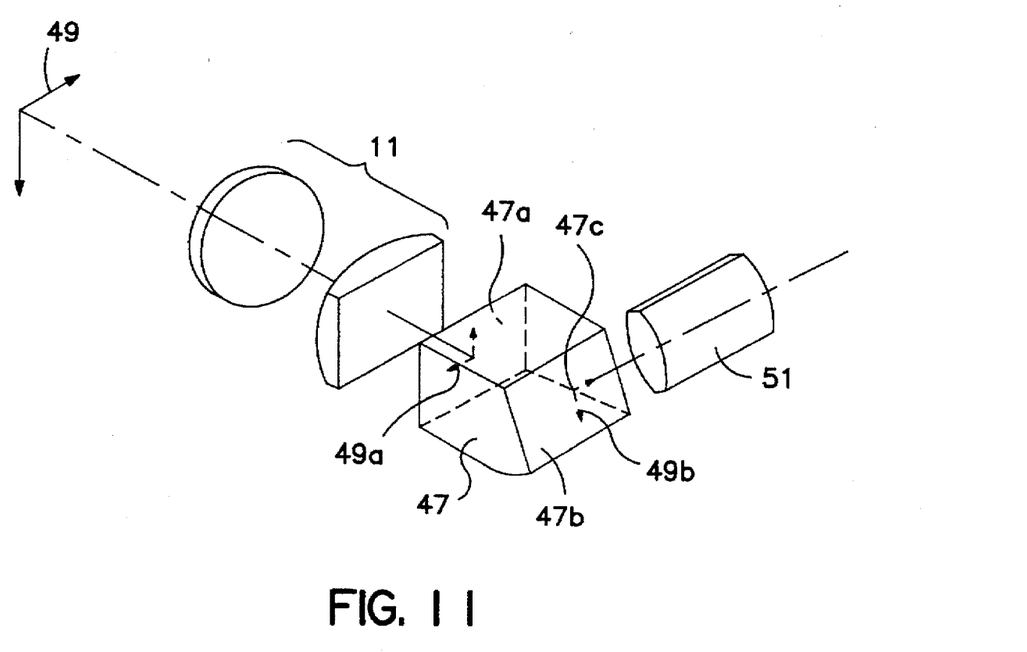
FIG. 11 is a perspective view of a viewfinder device in accordance with a fifth embodiment of the present invention.

FIG. 11 is a perspective view of a viewfinder device in accordance with the fifth embodiment of the present invention. Like elements in the first, second, third, fourth and fifth embodiments are referred to by like reference numerals.

In accordance with the fifth embodiment of the present invention, a fiber optical plate 47 transmits an inverted image 49a which has entered a plane of incidence 47a of the fiber optical plate 47 so that the inverted image 49a is rotated by, for example, 180 degrees around an exit axis 47c on an exit plane 47b. The exit plane 47b of the fiber optical plate 47 is tilted by, for example, 30 degrees with respect to the plane of incidence 47a, and further, the exit plane 47b is perpendicular to the exit axis 47c.

An eyepiece 51 which enlarges the upright image 49b on the exit plane 47b is positioned at a specified interval from the exit plane 47b so that it opposes and is parallel to the exit plane 47b.

In the viewfinder device in accordance with the fifth embodiment of the present invention, the objective lens group 11 forms an inverted image 49a of the subject image 49 on the plane of incidence 47a of the fiber optical plate 47. The inverted image 49a is transmitted via the fiber optical plate 47 with rotation, and becomes an upright image 49b of the same size as the image 49a on the exit plane 47b. The image on the exit plane 47b is then enlarged by the eyepiece 51 and observed by the photographer.

With the viewfinder device in accordance with the fifth embodiment, the exit plane 47b of the fiber optical plate 47 is tilted with respect to the plane of incidence 47a and is perpendicular to the exit axis 47c. Therefore, because the upright image 49b of the exit plane 47b is formed in a direction which is tilted with respect to the plane of incidence 47a, the photographer can peer down at an angle into the viewfinder, allowing photography to be performed in a comfortable posture.

Figure 12:
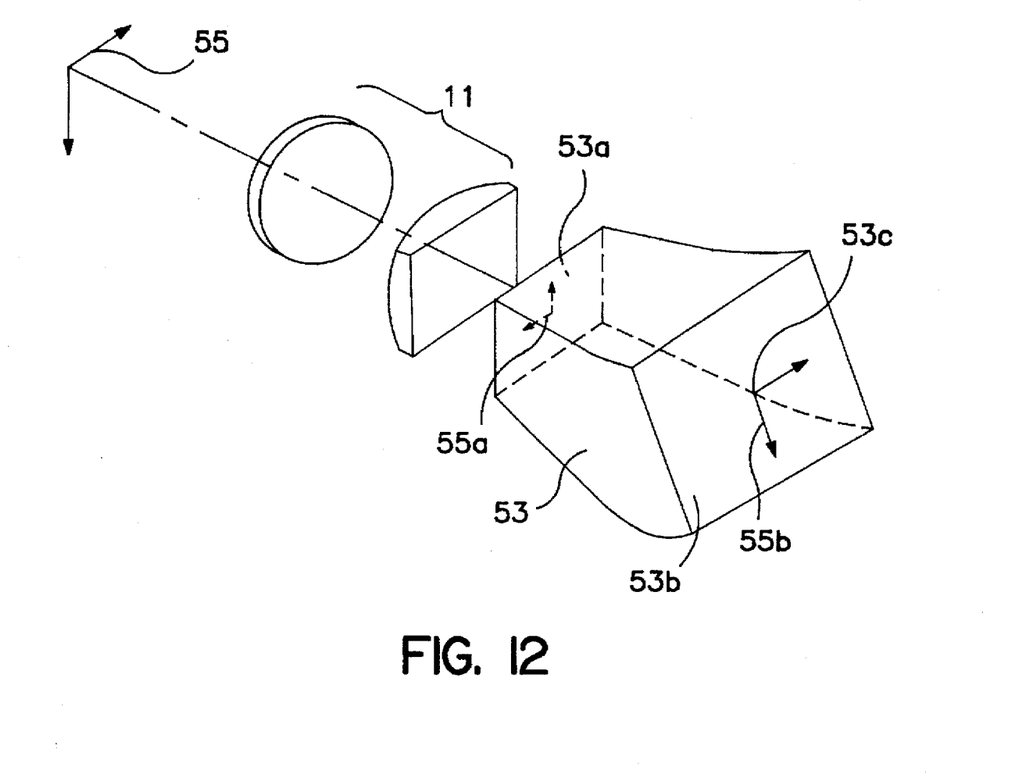
FIG. 12 is a perspective view of a viewfinder device in accordance with a sixth embodiment of the present invention.

FIG. 12 is a perspective view of a viewfinder device in accordance with a sixth embodiment of the present invention. Like elements in the first, second, third, fourth, fifth and sixth embodiments are referred to by like reference numerals. In accordance with the sixth embodiment of the present invention, the viewfinder includes a fiber optical plate which is a reversal tapered fiber optical plate 53 which transmits an inverted image 55a entering a plane of incidence 53a of the reversal tapered fiber optical plate 53 so that it becomes an enlarged upright image 55b on an exit plane 53b.

The exit plane 53b of the fiber optical plate 53 is tilted by, for example, 30 degrees with respect to the plane of incidence 53a, and the exit plane 53b is perpendicular to an exit axis 53c.

With the viewfinder device in accordance with the sixth embodiment of the present invention, the objective lens group 11 forms the inverted image 55a of the subject image 55 on the plane of incidence 53a of the reversal tapered fiber optical plate 53. The inverted image 55a is transmitted via the reversal tapered fiber optical plate 53, and is rotated and enlarged, becoming an upright image 55b enlarged, for example, to twice the size of the image 55a on the exit plane 53b. The image 55b is directly viewed by the photographer.

In accordance with the viewfinder device of the sixth embodiment of the present invention, the exit plane 53b of the fiber optical plate 53 is tilted with respect to the plane of incidence 53a and is perpendicular to the exit axis 53c. Therefore, a manner similar to that shown in the embodiment of FIG. 11, the upright image 55b on the exit plane 53b is formed so that it is in a direction which is tilted with respect to the plane of incidence 53a. As a result, the photographer can peer down at an angle into the viewfinder, and photography can be performed in a comfortable posture.

In accordance with the sixth embodiment of the present invention, the incident inverted image 55a is transmitted so that it becomes an enlarged upright image 55b on the exit plane 53b. Since the upright image 55b on the exit plane 53b is enlarged, it is possible to easily eliminate the need for an eyepiece, and the viewfinder device can be made more compact.

In accordance with the embodiments of the invention described above, examples of application of the present invention to camera viewfinder devices were explained; however, the present invention is not limited to application to camera viewfinder devices and, for example, the present invention can be widely applied to such devices as binoculars, telescopes and microscopes.

In accordance with the above-described embodiments of the invention, a viewfinder device can be simply configured, without using a reversal prism, by using a fiber optical plate wherein a subject image is formed on a plane of incidence of the fiber optical plate by an image-forming optical system, and the image is transmitted to an exit plane of the fiber optical plate.

Further, the fiber optical plate in accordance with the present invention does not have reflecting planes, as does a reversal prism, and, therefore, the space taken up by the components comprising the viewfinder can be reduced, and a compact viewfinder device can be achieved.

Still further, the fiber optical plate in accordance with the present invention does not have reflecting planes, as does a reversal prism, and, therefore, the expansion of the exit luminous flux can be made larger, and a viewfinder device with which the images are easy to see can be achieved.

In accordance with embodiments of the present invention, the optical image which enters the plane of incidence of the fiber optical plate is rotated as it is transmitted to the exit plane. The optical image entering the plane of incidence thereby becomes rotated around the exit axis on the exit plane, and the inverted real image is easily changed to an upright real image.

In accordance with embodiments of the present invention, the optical image which enters the plane of incidence of the fiber optical plate is enlarged as it is transmitted to the exit plane so that it becomes an enlarged image on the exit plane is easily viewable. Therefore, the need for an eyepiece can be easily eliminated, and the viewfinder device can be made more compact.

In accordance with embodiments of the present invention, the exit plane of the fiber optical plate is formed so that it is tilted with respect to the exit axis of the fiber optical plate. As a result, an image can be viewed from both the front and the top of the exit plane. Therefore, eye-level and waist-level viewfinders can be configured very simply.

In accordance with embodiments of the present invention, the exit plane of the fiber optical plate is tilted with respect to the plane of incidence and is perpendicular to the exit axis. The optical image of the exit plane is thereby formed in a direction which is tilted with respect to the plane of incidence. Therefore, the photographer can peer down at an angle into the viewfinder, and photography can be performed in a comfortable posture.

In accordance with embodiments of the present invention, the optical image of the exit plane of the fiber optical plate is reversed from top to bottom and left to right by a roof mirror. The optical image entering the plane of incidence can thereby be transmitted to the exit plane as is without rotation around the exit axis, thus simplifying fiber optical plate and reducing the cost.

In accordance with embodiments of the present invention, an eyepiece is positioned at a specified location on the exit plane side of the fiber optical plate, resulting in the advantage that the subject image can be easily enlarged and viewed.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A viewfinder device, comprising:
   an image-forming optical system to form an optical image, the image forming optical system having an optical axis; and
   a fiber optical plate having a plane of incidence and an exit plane, both the plane of incidence and the exit plane being positioned on the optical axis, the optical image being formed by the image-forming optical system on the plane of incidence and being transmitted to the exit plane, wherein the exit plane of the fiber optical plate is tilted with respect to the plane of incidence.

2. A viewfinder device as recited in claim 1, wherein the image-forming optical system forms the optical image in an image-forming plane, and the plane of incidence of the fiber optical plate is positioned on the image-forming plane.

3. A viewfinder device as recited in claim 1, wherein the optical image formed on the plane of incidence is rotated by the fiber optical plate to transmit a rotated optical image to the exit plane.

4. A viewfinder device as recited in claim 3, wherein the fiber optical plate rotates the optical image formed on the plane of incidence 180 degrees to form a reversed image at the exit plane.

5. A viewfinder device as recited in claim 1, wherein the fiber optical plate comprises a reversal tapered fiber optical plate which enlarges the optical image transmitted from the plane of incidence to the exit plane.

6. A viewfinder device as recited in claim 5, wherein the reversal tapered fiber optical plate rotates the optical image transmitted from the plane of incidence to the exit plane.

7. A viewfinder device as recited in claim 1, wherein the optical axis of the image forming optical system is coincident with an exit axis of the exit plane and the exit plane forms an angle with respect to the exit axis such that a size of an image on the exit plane seen from a direction along the optical axis and a size of an image on the exit plane seen from a direction perpendicular to the optical axis are approximately equal.

8. A viewfinder device as recited in claim 7, further comprising a roof mirror at a position opposite the exit plane, wherein the fiber optical plate transmits the optical image formed on the plane of incidence without rotating the optical image and the optical image at the exit plane is transmitted to the roof mirror.

9. A viewfinder device, comprising:
   an image-forming optical system to form an optical image, the image forming optical system having an optical axis; and
   a fiber optical plate having a plane of incidence and an exit plane, the optical image being formed by the image-forming optical system on the plane of incidence and being transmitted to the exit plane,
   wherein the fiber optical plate comprises a reversal tapered fiber optical plate having an exit plane which is tilted with respect to the plane of incidence and the exit plane is perpendicular to an exit axis of the exit plane.

10. A viewfinder device as recited in claim 9, wherein the exit plane is tilted by approximately 30 degrees with respect to the plane of incidence.

11. A viewfinder device, comprising:
    an image-forming optical system to form an optical image;
    a fiber optical plate having a plane of incidence and an exit plane, the optical image being formed by the image forming optical system on the plane of incidence and being transmitted to the exit plane; and
    an eyepiece for viewing the optical image formed by the image-forming optical system,
    wherein the plane of incidence of the fiber optical plate is positioned on the image forming plane of the image-forming optical system, and the eyepiece is positioned at a specified location on the exit plane side of the fiber optical plate, and the exit plane of the fiber optical plate is tilted with respect to the plane of incidence and is perpendicular to an exit axis.

12. A viewfinder as recited in claim 11, wherein the eyepiece enlarges the image on the exit plane and is parallel to the exit plane.

13. A viewfinder device as recited in claim 11, wherein the exit plane is tilted by 30 degrees with respect to the plane of incidence.

14. A camera having a viewfinder device, comprising:
    an image-forming optical system to form an inverted optical image of a subject;
    a fiber optical plate having a plane of incidence and an exit plane, the plane of incidence being positioned to receive the inverted optical image formed by the image-forming optical system, the fiber optical plate rotating the inverted optical image by 180 degrees while transmitting the optical image to the exit plane to reverse the inverted optical image at the exit plane; and a viewfinder window through which the optical image at the exit plane is directly viewable by a photographer, wherein the exit plane of the fiber optical plate forms an angle with respect to the plane of incidence such that an image on the exit plane can be viewed from a direction along the optical axis and a direction perpendicular to the optical axis.

15. A camera as recited in claim 14, wherein the fiber optical plate enlarges the optical image received at the plane of incidence.

* * * * *